3 Sheets—Sheet 1.
J. BAILEY.
Fare Register.
No. 231,952. Patented Sept. 7, 1880.
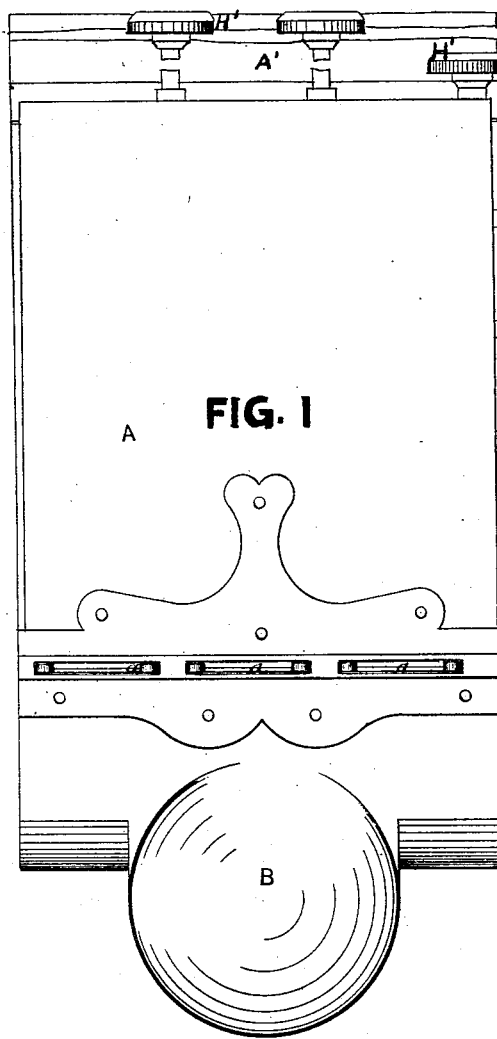
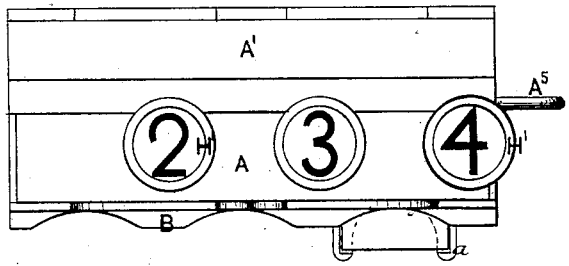
Witnesses:
H. G. E. Schultz.
J. Turk
Inventor:
Joseph Bailey
by his attorney
A. v. Briesen
N. PETERS, PHOTO-LITHOGRAPHER, WASHINGTON, D. C.

3 Sheets—Sheet 2.
J. BAILEY.
Fare Register.
No. 231,952. Patented Sept. 7, 1880.
FIG. 4
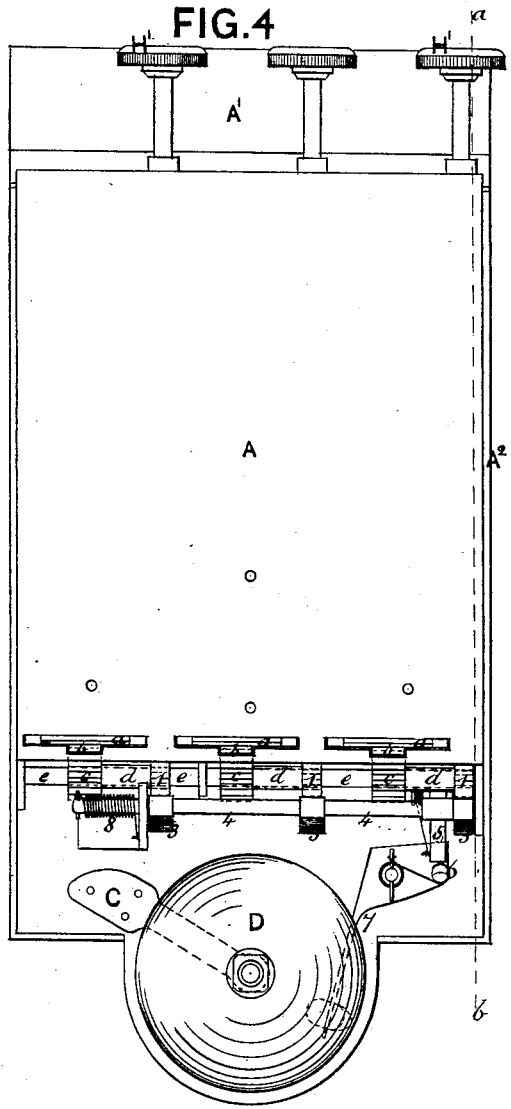
FIG. 5
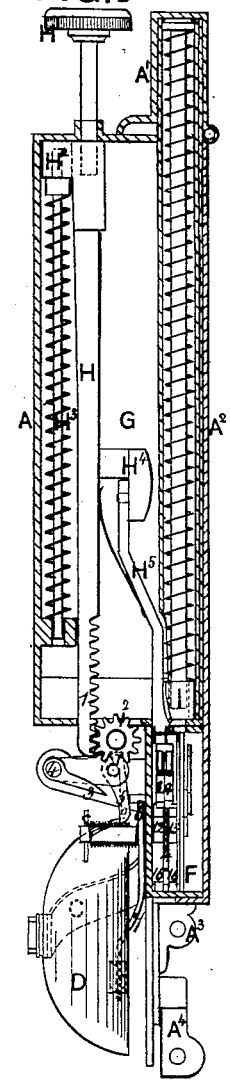

FIG. 8ᵃ 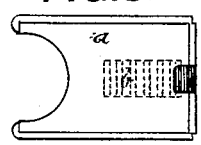

Figure 9:

FIG. 9ᵃ 
Witnesses:
W. J. E. Schultz
J. Turk
Inventor:
Joseph Bailey
by his attorney
A. v. Briesen
N. PETERS, PHOTO-LITHOGRAPHER, WASHINGTON, D. C.

3 Sheets—Sheet 3.
J. BAILEY.
Fare Register.
No. 231,952. Patented Sept. 7, 1880.
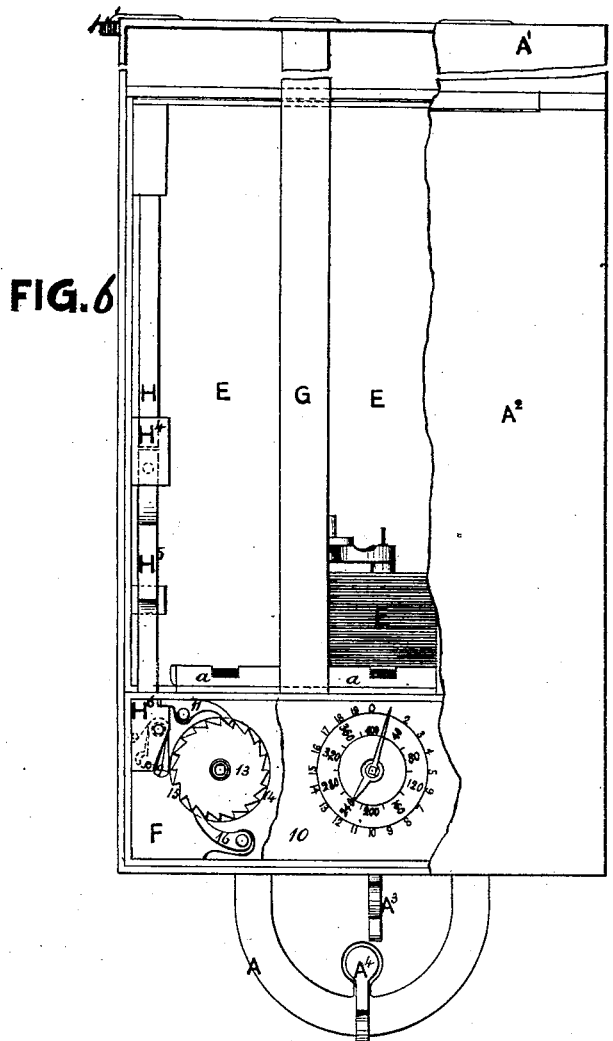
FIG.6
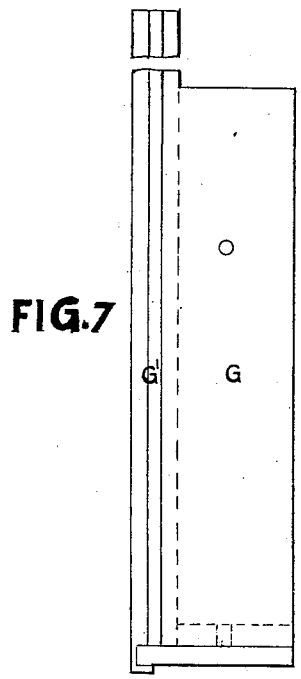
FIG.7
FIG.7ª
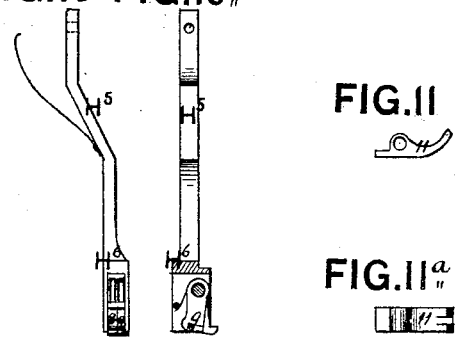
FIG.10  FIG.10ª
FIG.11
FIG.11ª
FIG.12
FIG.12ª
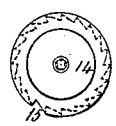
FIG.13
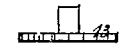
FIG.13ª
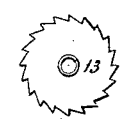
Witnesses:
W. J. E. Schultz
J. Turk
Inventor:
Joseph Bailey
by his attorney
A. v. Briesen
N. PETERS, PHOTO-LITHOGRAPHER, WASHINGTON, D. C.

UNITED STATES PATENT OFFICE.

JOSEPH BAILEY, OF LAVENDER HILL, ENGLAND.

FARE-REGISTER.

SPECIFICATION forming part of Letters Patent No. 231,952, dated September 7, 1880.

Application filed August 19, 1879.

*To all whom it may concern:*

Be it known that I, JOSEPH BAILEY, of Lavender Hill, in the county of Surrey, England, have invented new and useful apparatus for registering or recording the receipts of moneys or fares on omnibuses, tramway-cars, steamships, in theaters, and in other places where the receipt of moneys is required to be checked, which invention is fully set forth in the following specification, reference being had to the accompanying drawings, and to the figures and letters marked thereon—that is to say:

The object of this invention is to provide an improved indicating and registering apparatus for the purpose of checking the receipts of moneys or fares by conductors, guards, and collectors of cash payments.

This improved apparatus is a combined indicator, alarm, and special ticket-deliverer for receipts or payments of various values, and is of convenient size, light but strong construction, and handy for manipulation.

A case or box is provided wherein are arranged certain chambers separated one from the other by hollow partitionings, said chambers being for the reception of tickets representing different values, one class or value of ticket being in each separate compartment.

In order that the invention may be well understood, I have hereunto annexed a sheet of drawings illustrative thereof, wherein—

Figure 8:
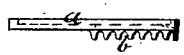

Figure 1 is a front view of a three-fare apparatus complete, with one of the plungers depressed, as it would be when a ticket is issued and the issuing of the ticket is registered. Fig. 2 is a side view from right of Fig. 1, and Fig. 3 a top view, showing the ticket-carrier projected for delivery of the ticket upon the depression of the corresponding plunger. Fig. 4 is a front view with the bell-cover removed for purpose of showing the actuating mechanism of the ticket-carrier and alarm-bell, the actuating plungers and connections being in their normal position. Fig. 5 is a sectional side view from right of Fig. 4 at line $ab$; Fig. 6, a view of back of apparatus, as shown in Fig. 4, with part of cover broken away for purpose of showing the registering-dials and actuating-gearing. Figs. 7 and $7^a$ represent, in side view and plan, respectively, the hollow partitioning of the ticket-chambers wherein work the plunger-connections. Figs. 8 and $8^a$ represent, in side and top view, the ticket-carrier plate with its toothed rack on under side. Figs. 9 and $9^a$ represent, in side view and plan, the presser-pedal, which is acted upon by spring to hold down the tickets in their chambers. Fig. 10 is a side view of the compound arm of the actuating-plunger, the lower end whereof extends into the registering-chamber and carries the two spring-catches for actuating the toothed registering-wheels. Fig. $10^a$ is front view from right of Fig. 10, partly in section, showing the details of the fitting of the spring-catches. Figs. 11 and $11^a$ are side and under views of stop-catch for registering-wheels, to prevent same overthrowing—that is, being turned more than one tooth at a time on the return action of the plunger. Figs. 12 and $12^a$ represent, in side and top view, the unit-registering wheel with the dividing single-toothed plate, and Figs. 13 and $13^a$ are like views of the decimal-wheel.

A is the main case of the apparatus; B, the bell-cover; A′, the cap of the case, carrying the hinged back or cover $A^2$. $A^3$ is a lug at foot of cover, and $A^4$ a swiveling piece upon the foot of case A.

Holes are provided in $A^3$ and $A^4$, to which a tape, which may be tied and sealed, or a padlock may be fastened.

C is bracket carrying bell D. E are the ticket-chambers, one for each separate class or value of ticket.

Below the ticket-chambers is a chamber, F, wherein is arranged the registering mechanism consisting of toothed gearing, dial-plates, and index-fingers or pointers arranged on the pivots of the gearing, and in combination with this registering-mechanism chamber is a chamber for reception of the alarm-bell and striking mechanism, this latter being formed and inclosed in the bell-cover B.

Within the hollow partitioning G of the ticket-chambers is arranged a spindle or plunger-rod, H, which at the upper end projects out from the casing and terminates in a button, H′, and the lower end of the said plunger-rod extends out below the casing A into the bell-chamber, and terminates in a foot formed as a rack for purpose hereinafter described.

Also, within the hollow partitioning or in a tube therein is arranged one arm of a cranked presser-pedal, I, acted upon by a spiral spring, the neck of the said presser-pedal being free to move so as to be raised and lowered in a vertical slot, G', in the said hollow partitioning or tube therein, and the foot of the said presser-pedal extends into the ticket-chambers so as, by the action of the spring, to give a more or less gentle pressure upon the tickets.

At the bottom of each ticket-chamber is a slide or carrier, $a$, which is recessed upon the upper side to a sufficient depth to receive one ticket only, and on the under side of the said ticket-carrier is a ratchet or rack, $b$, for purpose of actuating the ticket-carrier to project same along with the one ticket in the recess thereof through a slot in the face of the apparatus, said ratchet of the ticket-carrier being geared with a toothed wheel or pinion, $c$, on a collar, $d$, mounted loosely upon a shaft, $e$, extending across the upper part of the bell-chamber. Each of the loose collars $d$ upon the said shaft $e$ is provided with a second toothed wheel or pinion, 2, in gear with the rack 1 at the foot of the plunger-rod. This said foot 1 of the plunger-rod also acts upon a cam, 3, arranged upon a rocking shaft, 4, which also carries a spring-catch, 5, which gears with and actuates one arm, 6, of a pivoted lever, the other end, 7, of which lever is attached to the striking-hammer of the bell.

The rocking shaft has a spiral spring, 8, arranged upon one end thereof, which will always effect the return of the said rocking shaft and its cam or cams 3 to its normal position after said rocking shaft has been actuated for striking the bell by the action of the plunger-rod foot upon said plunger being depressed for the purpose of actuating the double-pinioned collar $d$ and its pinion-wheels $c$ and 2 on the cross-shaft $e$, for delivering the ticket and actuating the counting or registering mechanism, which will be operated, arranged, and constructed as follows: The plunger-rod has been described as working within the hollow partitioning of the ticket-chambers, and this plunger is of compound construction. A shoulder, $H^2$, thereon is acted upon by a spiral spring, $H^3$, to return the plunger H home after making a throw—that is, after being depressed. A bracket-piece, $H^4$, is also formed on the said plunger-stem, and may be recessed to form a catch to receive a corresponding catch on the end of the rod or compound arm $H^5$, which engages at its upper end with the bracket portion $H^4$; or, as shown, a small stud on the bracket $H^4$ and an eye in the upper end of $H^5$ are employed to aid in holding the two parts together. This said compound arm $H^5$, so connected with the plunger, has on the back thereof a spring-tongue to keep its eye up to the stud of the bracket-piece $H^4$ and steady it, and its lower end, $H^6$, is extended into the registering-chamber, and is formed with double plates, constituting a boxing, in which are carried two spring-catches or pawls, 8 and 9, which are provided for purpose of actuating the toothed registering-wheels upon and just before the completion of the back action of the plunger H after it has been depressed to strike the bell and issue the ticket.

The toothed registering-wheels are arranged upon a dial-plate, 10, and their arbors extend through the plate 10 and carry index-fingers or pointers. The arrangement of wheels that I have employed is as follows: The edges of two wheels, 12 and 13, (see Figs. 12 and 12$^a$ and Figs. 13 and 13$^a$,) are serrated with twenty teeth, (other number might be employed,) and said two wheels are mounted together side by side—that is, one at the back of the other. The main arbor of the wheels carries the unit-wheel 12 fast thereon, and carries the unit-finger, and the decimal-finger is carried on the hollow arbor of the decimal-wheel 13, which hollow arbor is carried loosely on the main or unit arbor. The unit-wheel 12 has attached or riveted thereto, on the back thereof and between the two wheels, a circular plate, 14, of corresponding diameter to the wheels, said plate having one notch or tooth, 15, on its periphery, corresponding to the teeth of the wheels—$i.e.$, as deep as any one of the notches of wheel 13. Thus as the two spring-catches 8 and 9 of the plunger-rod $H^5$ are depressed they pass down over the teeth of the wheels, and after the operation of striking the bell and delivering of the ticket has been performed, and the plunger returns after being depressed, the first or unit spring-catch, 8, acts upon the unit-wheel 12, and advances it and its pointer the distance of one tooth, at the same time that the second or decimal spring-catch rides over the plain portion of the periphery of the single-toothed disk 14, between the two wheels 12 and 13, until, upon the completion of the revolution of the unit-wheel, the open portion 15 of the dividing-disk will allow the second or decimal spring-catch 9 of the plunger-rod to engage with a tooth of the decimal-registering wheel 13, and so advance the decimal-wheel and its pointer the distance of one tooth, at the same time that the unit-wheel is brought to cover by the plain portion of the disk-wheel, the next tooth of the decimal-wheel, so that a complete revolution of the unit-wheel 12 must take place before a tooth of the decimal-wheel 13 will be exposed to the action of the decimal spring-catch 9. Stop-catches 16 are employed, as usual, in this class of mechanism, to stop the toothed wheels 12 and 13 from turning in the wrong direction.

To prevent all shake or overthrowing of the said toothed registering-wheels in a forward direction—that is, to prevent any liability of the said wheels being turned more than one tooth at a time—a stop-catch, 11, Figs. 11 and 11$^a$, is pivoted on the dial-plate 10 to gear with the toothed registering-wheels 12 and 13, the point of said stop-catch 11 being divided by a part being filed away so as to provide a catch for both registering-wheels, and at the opposite end of said stop-catch 11 is a flat tongue, which is acted upon by a shoulder of the boxing $H^6$, as clearly shown in Fig. 6, for when the plunger is depressed said catch 11 will be free to allow of the toothed registering wheel or wheels being actuated by their pawls 8 and 9.

The unit-pointer is a long hand, and the decimal-pointer is a short hand. Thus the long hand makes one movement for each ring of the bell, which is simultaneous with the depression of the plunger and the delivery of the ticket, and the short hand indicates each score of twenty movements made by the long hand. When the day's work is done the number of tickets issued and the number of fares received for each class or value are accurately denoted on the dials.

The apparatus that I have constructed is made with three ticket chambers or compartments and three corresponding sets of registering apparatus and ticket-delivering mechanism, and is therefore capable of registering or recording three different values of payments—such as, for instance, one-penny, two-penny, or three-penny fares for tramways, omnibuses, steamboats, or, otherwise, for collecting excess fares on railways, or receipts of other or similar kinds for higher prices or values. It will be obvious that any number of compartments of the apparatus and sets of registering mechanism may be provided in each machine according to the purposes for which it is to be employed.

The button-heads $H'$ of the plungers, which extend out from the case, are numbered or marked for purpose of distinction. This may be advantageously effected by employing screwed caps having glass tops, similar to the lens of a telescope, below which properly-figured disks will be placed, the caps being screwed on the buttons. The disks may be interchangeable, and be marked with any number denoting a certain value, and placed below the glass of the button-top, so that the instrument may be utilized for registering receipts of any required value.

The back of the apparatus has a hinged cover terminating in a foot-plate, $A^2$, and, for the purpose of locking, an ear, $A^3$, extends out thereupon, and a turning catch or button, $A^4$, is provided, which extends to the said ear $A^3$ when turned around, and a hole is provided in the end of the turning-catch $A^4$, and also one in the ear $A^3$ on the lid or cover foot-plate $A^2$, and before the instrument is delivered to the conductor or collector, and after the chambers E are filled with tickets, a piece of tape or string is passed through the holes, and when tied is sealed with wax, so as to insure that the apparatus will not be tampered with, or a padlock may be used.

On the apparatus suitable staples $A^5$ are fixed for purpose of attachment, as, for instance, by strap when carried by a conductor, (one only is shown in Figs. 1, 2, and 3,) or flat staples may be employed and screwed to a desk or wall or door, as the case may be.

Having now described the nature and particulars of the said invention in such wise that the same may be readily understood and carried into practical effect, I claim—

1. In registering and indicating mechanism, the compound lever H, $H'$, $H^2$, $H^3$, $H^4$, and 1, with the compound arm $H^5$ $H^6$, with its two spring-catches 8 and 9, arranged and operating substantially as herein set forth, and as shown by the drawings.

2. The double-pinioned collar-piece $c$ $d$ 2 on the shaft $e$, operated by the foot 1 of the plunger to project the ticket-carrier $a$ $b$ for delivery of a ticket from the compartments E of the machine, as herein set forth, and shown by the drawings.

3. The recessed ticket-carrier $a$, having rack $b$ in the ticket-chamber E, combined with wheel $c$ on shaft $e'$, and with pinion 2, rack 1, and compound lever H $H'$, $H^2$, $H^3$, and $H^4$, and with the presser-pedal I, constructed and operated substantially as herein set forth.

In testimony whereof I have hereunto set my hand.

JOS. BAILEY.

Witnesses:
WALTER A. BARLOW,
W. H. C. JEROME,
6 *St. Paul's Churchyard, London.*